United States Patent
Shimada et al.

[19]

[11] Patent Number: 5,964,675
[45] Date of Patent: Oct. 12, 1999

[54] GEAR RATIO SHIFT CONTROL SYSTEM FOR AUTOMATIC VEHICLE TRANSMISSION

[75] Inventors: Takamichi Shimada; Noboru Sekine, both of Wako, Japan

[73] Assignee: Honda Giken Kogyo Kabushiki Kaisha, Tokyo, Japan

[21] Appl. No.: 09/140,283

[22] Filed: Aug. 26, 1998

[30] Foreign Application Priority Data

Aug. 29, 1997 [JP] Japan ................................ 9-249422

[51] Int. Cl.[6] .................................................. F16H 61/08
[52] U.S. Cl. ......................... 475/123; 477/86; 477/176; 701/67; 475/128
[58] Field of Search ................................ 477/176, 174, 477/175, 86, 143, 156; 701/67, 66; 475/116, 120, 121, 123, 128; 74/335, 336 R

[56] References Cited

U.S. PATENT DOCUMENTS

| | | | |
|---|---|---|---|
| 5,305,663 | 4/1994 | Leonard et al. | 475/123 |
| 5,370,016 | 12/1994 | Fujita et al. | 74/336 R |
| 5,520,586 | 5/1996 | Brown et al. | 475/120 |
| 5,613,583 | 3/1997 | Kono et al. | 477/176 X |
| 5,627,750 | 5/1997 | Kono et al. | 477/176 X |
| 5,697,867 | 12/1997 | Kono et al. | 477/176 |
| 5,719,768 | 2/1998 | Tashiro et al. | 701/67 |
| 5,749,061 | 5/1998 | Kono et al. | 701/67 X |
| 5,779,595 | 7/1998 | Kono et al. | 477/174 |
| 5,857,443 | 1/1999 | Kono et al. | 477/176 X |

FOREIGN PATENT DOCUMENTS

| | | |
|---|---|---|
| 62-246653 | 10/1987 | Japan . |
| 6-307524 | 11/1994 | Japan . |
| 8-184367 | 7/1996 | Japan . |
| 8-277921 | 10/1996 | Japan . |

*Primary Examiner*—Dirk Wright
*Assistant Examiner*—Peter T. Kwon
*Attorney, Agent, or Firm*—Armstrong, Westerman, Hattori, McLeland & Naughton

[57] ABSTRACT

A system for controlling gear (gear ratio) shifting in an automatic transmission mounted on a vehicle, including a shift control means for generating a shift command to upshift from one gear (gear ratio) currently established to a next gear (gear ratio) by determining a command to the solenoid valves to discharge the pressurized oil from the frictional engaging elements that establish the current gear (gear ratio) so as to slip-control the frictional engaging elements, and to charge the pressurized oil to the frictional engaging elements that establish the next gear (gear ratio) to be shifted to. The system includes a first step for determining the command such that an actual slip rate of the frictional engaging elements that establish the current gear (gear ratio) converges to a first desired slip rate, a second step for determining the command such that the actual slip rate of the frictional engaging elements that establish the current gear (gear ratio) converges to a second desired slip rate, maximum slip rate detecting means for detecting a maximum actual slip rate, slip rate difference calculating means for calculating a difference between the detected maximum actual slip rate and the second desired slip rate, command correcting means for correcting the command in response to the calculated difference, and command storing means for storing the corrected command to be used as the command in the first step in controlling a next upshift. This arrangement can avoid the clutches (and brakes) from being suffered excessive slippage, thereby improving the service life of the clutches and brakes and making the control to smooth shift to that for the next gear (gear ratio).

9 Claims, 11 Drawing Sheets

FIG.2

| GEARS | K1 | K2 | K3 | B1 | B2 | GEAR RATIOS |
|-------|----|----|----|----|----|-------------|
| 1st   | ○  |    |    |    | (○) | 3.577 |
| 2nd   | ○  |    |    | ○  |    | 2.100 |
| 3rd   | ○  |    | ○  |    |    | 1.400 |
| 4th   | ○  | ○  |    |    |    | 1.000 |
| 5th   |    | ○  | ○  |    |    | 0.711 |
| RVS   |    |    | ○  |    | ○  | 2.953 |

FIG.5

| GEARS | SOLENOID VALVES | | | | |
|---|---|---|---|---|---|
| | SA | SB | SC | SD | SE |
| 1st | OFF | OFF | ON | OFF | OFF (ON FOR ENGINE BRAKING EFFECT) |
| 2nd | OFF | OFF | ON | ON | OFF (ON FOR LOCK-UP) |
| 3rd | OFF | OFF | OFF | OFF | OFF (ON FOR LOCK-UP) |
| 4th | OFF | ON | ON | OFF | OFF (ON FOR LOCK-UP) |
| 5th | ON | ON | OFF | OFF | OFF (ON FOR LOCK-UP) |
| RVS | OFF | OFF | OFF | OFF | OFF |

5,964,675

GEAR RATIO SHIFT CONTROL SYSTEM FOR AUTOMATIC VEHICLE TRANSMISSION

BACKGROUND OF THE INVENTION

FIELD OF THE INENTION

The present invention relates to a gear ratio shift control system for an automatic vehicle transmission, and in particular relates to a system for controlling the supply of oil pressure through shift solenoid valves to frictional engaging elements that establish the current gear (gear ratio) shifted from when upshifting.

DESCRIPTION OF THE RELATED ART

In an automatic vehicle transmission which includes a plurality of gear trains, the engagement or disengagement of frictional engaging elements such as hydraulic clutches or brakes and some similar elements is controlled through shift solenoid valves to enable one gear (gear ratio) to be selected from among the plurality of gear trains, whereby the engine power is transmitted to the vehicle. More specifically, upshifting or downshifting is conducted by disengaging frictional engaging elements for the current gear (gear ratio) shifted from, while engaging frictional engaging elements for the next gear (gear ratio) shifted to, by energizing or de-energizing the shift solenoids.

In order to effect smooth shifting without lag, it is necessary to accurately set the time points at which the current gear (gear ratio) frictional engaging elements are disengaged and the next gear (gear ratio) frictional elements are engaged, and to control the shift sequence beginning from disengagement of the current gear (gear ratio) frictional engaging elements up to the full engagement of the next gear (gear ratio) frictional engaging elements. For that purpose, Japanese Laid-open Patent Application No. 62 (1987)—246,653 teaches decreasing the current gear clutch oil pressure to slip the clutches so as to absorb the inertia torque.

Since it is difficult, however, to determine in the prior art when the current gear (gear ratio) clutches begin to slip. For that reason, the assignee proposes, in Japanese Laid-open Patent Applications No. 6 (1994)—307,524 and No. 8 (1996)—277,921, dividing the shift control sequence period for the current gear (gear ratio) into several steps, decreasing the current gear (gear ratio) clutch oil pressure and feedback-controlling the clutch slippage in response to the detected throttle opening and engine output torque.

However, the clutch slippage is affected by the condition of the clutch such as aging, the clutch plate temperature, gear shifting and some similar parameters. As a result, even when the oil pressure is controlled as desired, the time point at which the clutches slip varies with the clutch conditions. Moreover, the oil pressure should be increased such that the clutch service life would be affected to a lesser extent by the slippage. It is therefore desirable to shorten the period of clutch slippage and hence, to shorten the current gear shift control sequence period. This will not only elongate the clutch service life, but also provide for smooth execution of the next gear (gear ratio) shift or transition.

An object of the present invention is therefore to solve the drawbacks in the prior art and provide a gear ratio shift control system for an automatic vehicle transmission which can supply oil pressure to the frictional engaging elements that establish the current gear (gear ratio), thereby improving the service life of the frictional engaging elements and providing for smooth execution of the next gear (gear ratio) shift or transition.

BRIEF DESCRIPTION OF THE DRAWINGS

The above and other objects and advantages of the invention will be more apparent from the following description and drawings, in which:

FIG. 2 is a table showing engagement or disengagement of the frictional engaging elements for respective gears (gear ratios) illustrated in FIG. 1;

FIG. 5 is a table showing energization or de-energization of the (shift) valves for respective gears (gear ratios) illustrated in FIG. 1;

DETAILED DESCRIPTION OF THE PREFERRED EMBODIMENTS

With reference to the appended drawings, a detailed description of the preferred embodiments will be given below.

Figure 1:
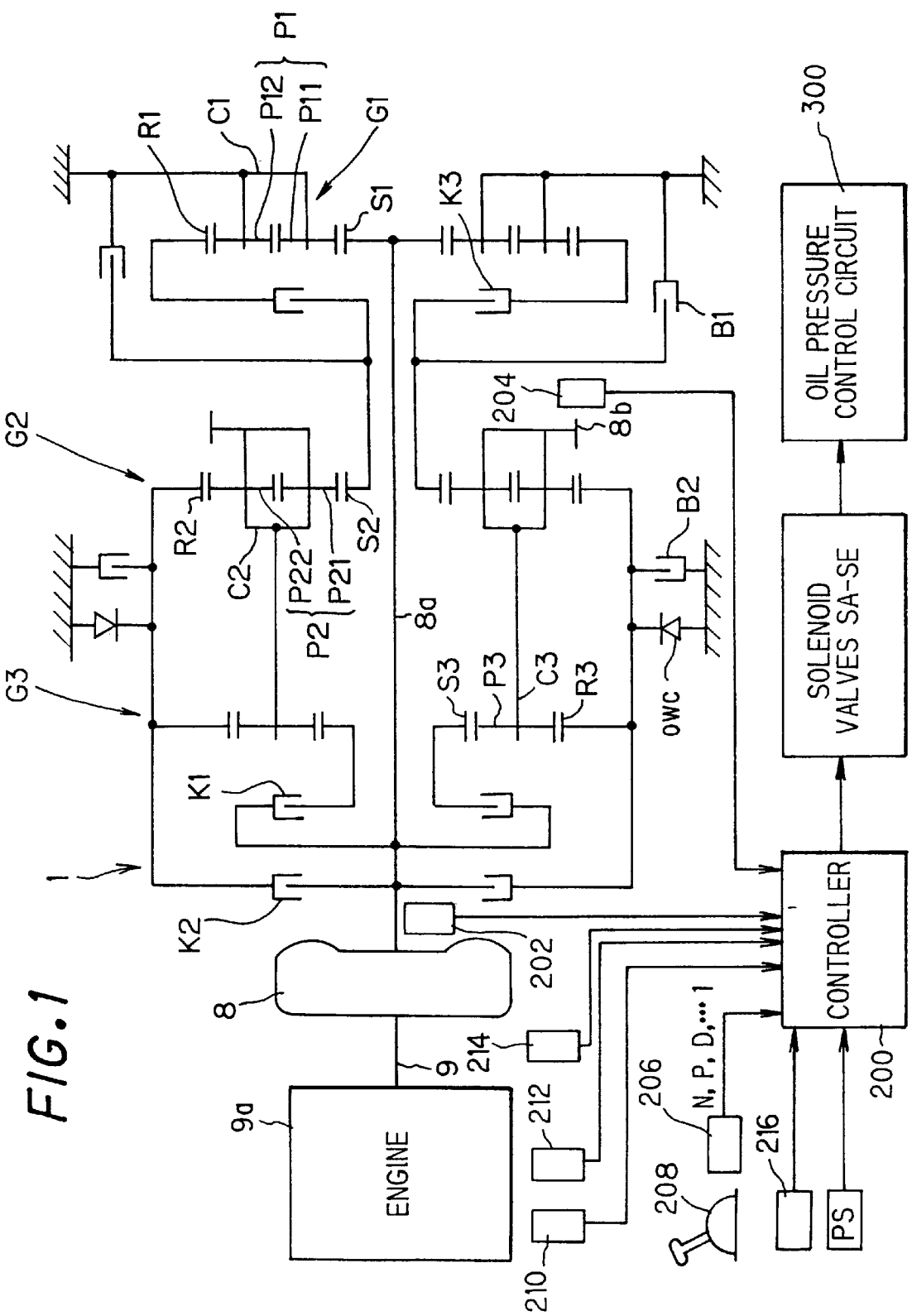
FIG. 1 is a schematic diagram showing a gear ratio shift control system for an automatic vehicle transmission according to the present invention.

FIG. 1 is a schematic diagram showing a gear ratio shift control system for an automatic vehicle transmission according to the present invention.

As illustrated, an automatic vehicle transmission 1 has a hydraulic torque converter 8 whose pump (not shown) is connected to an engine output shaft 9 of an internal combustion engine 9a and whose turbine (not shown) is connected to a transmission input shaft 8a and first, second and third planetary gear trains G1, G2, G3 provided in a parallel arrangement on the transmission input shaft 8a.

The first, second and third planetary gear trains G1, G2, G3 are each constructed from centrally positioned first, second and third sun gears S1, S2, S3; first, second and third revolving planetary pinions P1, P2, P3 which mesh with the first, second and third sun gears S1, S2, S3 to rotate therearound; first, second and third carriers C1, C2, C3 which hold the pinions P1, P2, P3 to enable free rotation thereof while rotating in the same way that the pinions revolve; and first, second and third ring gears R1, R2, R3 which include inner teeth to mesh with the pinions P1, P2, P3.

The first planetary gear train GI and the second planetary gear train G2 are double-pinion type planetary gear trains and, as shown in the diagram, the first pinion P1 and the second pinion P2 are each constructed from two pinion gears P11, P12 and P21, P22.

The first sun gear S1 is normally connected to the transmission input shaft 8a, and the first carrier C1 is normally fixed. The first ring gear R1 is connected to the second sun gear S2 via a third hydraulic clutch K3, and it is possible to hold the second sun gear S52 by a first brake B1. The second carrier C2 is connected to the third carrier C3 and an output gear 8b, whereby the rotation of the second carrier C2 and the third carrier C3 forms the output rotation of the transmission.

The second ring gear R2 is directly connected to the third ring gear R3 such that the gears R2 and R3 as a whole can be held by a second brake B2, and are mounted on the transmission input shaft 8a to be engaged thereon by a second clutch K2. The third sun gear S3 is mounted on the transmission input shaft 8a to be engaged thereon by a first clutch K1. A one-way clutch OWC is placed in a parallel arrangement with the second brake B2.

In the above-described transmission comprising first to third sun gears S1 to S3, first to third carriers C1 to C3, and first to third ring gears R1 to R3, the transmission input shaft 8a and the output gear 8b, it is possible to control the establishment of a gear (gear ratio) and the shifting to another gear (gear ratio) by engaging or disengaging the frictional engaging elements made up of the first to third clutches K1 to K3 and the first and second brakes B1 and B2. More specifically, when the frictional engaging elements are controlled to be engaged or disengaged as shown in FIG. 2, it is possible to establish five forward gears (gear ratios) (1st, 2nd, 3rd, 4th and 5th) and one reverse gear (gear ratio) (RVS). Although the reduction gear ratios for each gear (gear ratio) vary with the number of teeth of each gear, one possible example is illustrated in FIG. 2.

In FIG. 2, the parentheses around the second brake B2 for 1st gear (gear ratio) indicate that even when the brake B2 is not engaged, power transfer takes place by the one-way clutch OWC. Specifically, even when the second brake B2 is not brought into operation, if the first clutch K1 is engaged, it is possible to establish 1st gear (gear ratio) and thereby transfer power at the 1st gear ratio. More specifically, when the second brake B2 is operated, 1st gear (gear ratio) is established carrying the engine braking effect. In the case that 1st gear (gear ratio) is established without bringing that second brake B2 into engagement, no engine braking effect is obtained since it is not possible to transmit the power from the wheel in that case, even though 1st gear (gear ratio) is established.

In order to control the supply of oil pressure to these frictional engaging elements, there is provided a controller 200 comprising a microcomputer which receives outputs of a speed sensor 202 comprising a magnetic pickup and installed in the vicinity of the transmission input shaft 8a for generating a signal indicative of a transmission input shaft speed Nin, a speed sensor 204 similarly comprising a magnetic pickup and installed in the vicinity of the output gear 8b for generating a signal indicative of a transmission output shaft speed Nout, and a selector lever switch 206 connected to a selector lever 208 positioned in the vicinity of the driver's seat for generating a signal corresponding to one among gear ranges selected by the driver.

In addition, the controller 200 receives outputs of a crank angle sensor 210 installed in the vicinity of a crank shaft (not shown) of the engine 9a for generating a signal indicative of an engine speed NE, a throttle position sensor 212 installed in the vicinity of a throttle valve (not shown) for generating a signal indicative of an engine load through an opening degree OTH of a throttle valve and a vehicle speed sensor 214 installed in a drive shaft (not shown) for generating a signal indicative of a traveling speed V of the vehicle in which the automatic vehicle transmission 1 is mounted.

Based on the parameters thus detected, the controller 200 energizes (ON) or de-energizes (OFF) solenoid valves (more precisely shift solenoid valves) SA to SE to control the supply of oil pressure to the frictional engaging elements through oil pressure control circuit 300 as will be explained later. The oil pressure in the circuit 300 is detected by five pressure sensors PS as will be explained later and outputs thereof are sent to the controller 200.

Figure 3:
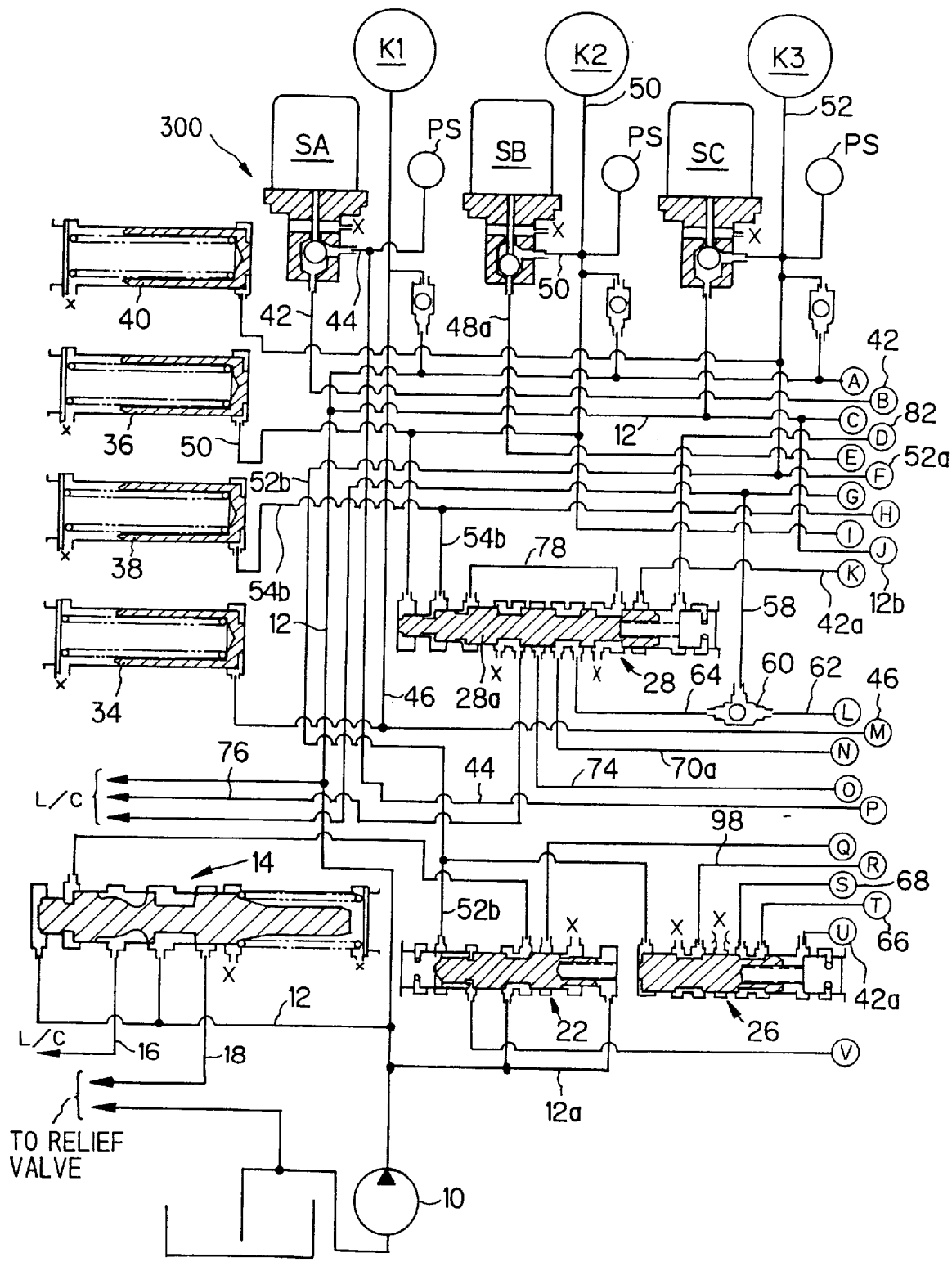
FIG. 3 is a diagram showing a part of the hydraulic circuit shown in FIG. 1.
Figure 4:
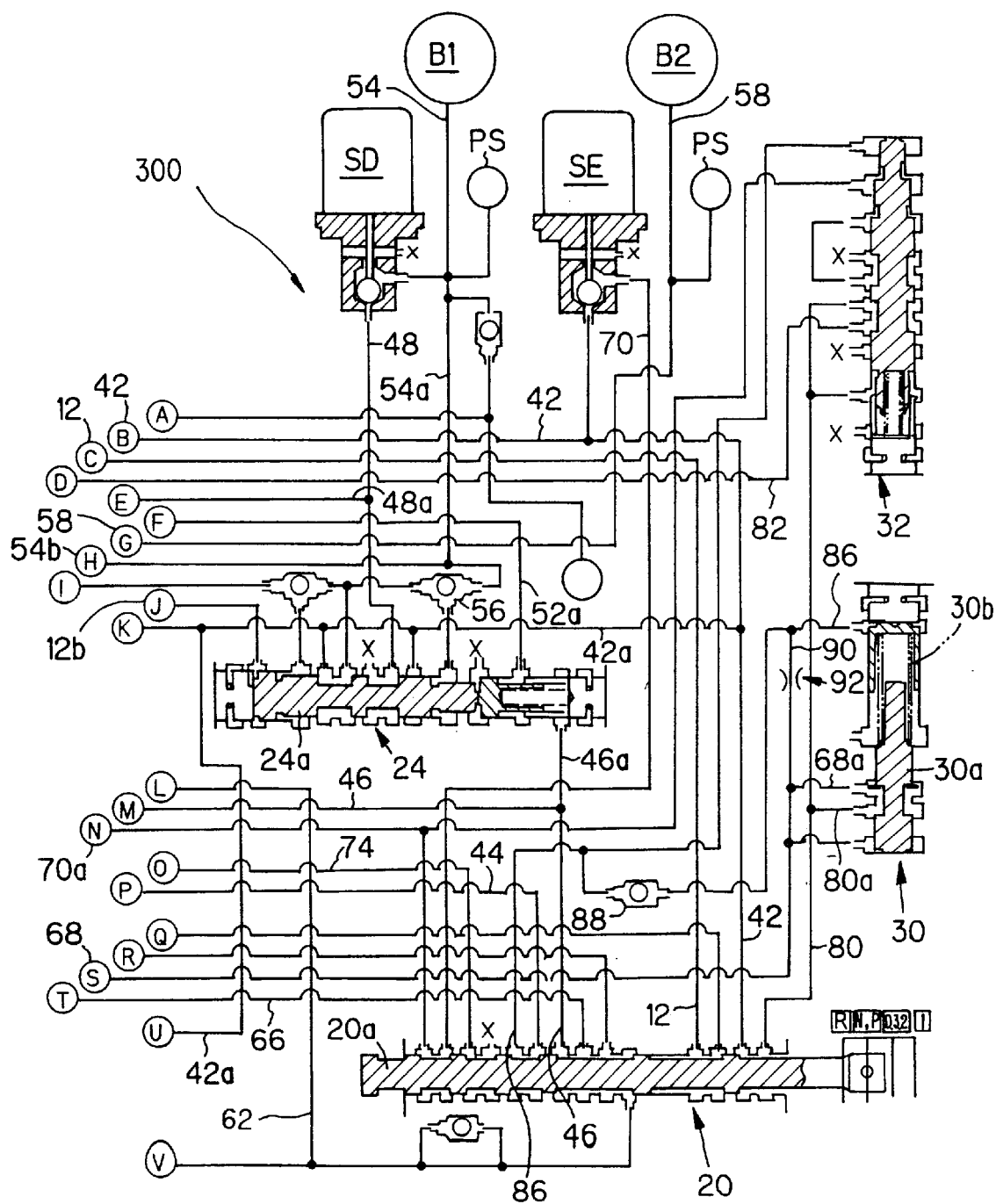
FIG. 4 is a diagram similarly showing a part of the hydraulic circuit shown in FIG. 1.

Next, with reference to FIGS. 3 and 4, a description will be given for the oil pressure control circuit 300 for engaging and disengaging the first to third clutches K1 to K3 and the first and second brakes B1 and B2. FIGS. 3 and 4 show portions of the oil pressure control circuit 300. In each of the drawings, the end terminals of the oil paths indicated by encircled letters indicate where such oil paths connect to the oil paths in the other drawing. Further, the symbol "x" in the drawings indicates the ports that are open for draining.

The operation of the brakes and clutches for controlling gear (gear ratio) shifting is carried out utilizing oil pressure from the pressurized oil supplied from the oil reservoir shown in the bottom portion of FIG. 3 by an oil pump 10.

The pressurized oil which is pumped into an oil path 12 from the pump 10 is adjusted by a regulator valve 14 to have a prescribed line pressure. When pressurized oil is pumped out by the pump 10, a portion of such oil will be supplied to the oil path 12, with the remainder thereof being sent out through the regulator valve 14 to an oil path 16. The pressurized oil which is sent to the oil path 16 is then supplied for controlling the lockup clutch of the torque converter (not shown). Pressurized oil which is sent to an oil path 18 is returned to the oil reservoir via a relief valve (not shown).

The pressurized oil in the oil path 12 which has been adjusted to have a prescribed line pressure as described above is supplied to the relevant parts of the oil pressure control circuit to be used for controlling gear (gear ratio) shifting in the automatic transmission. Arranged among the relevant parts are a manual valve 20 which is connected to the selector lever 208 arranged in the vicinity of the driver's seat to enable operation, the five (shift) solenoid valves SA to SE which are controlled to be energized (ON) or deenergized (OFF) by the aforesaid controller depending on parameters including the driver's manual range selection, six hydraulically operated valves 22, 24, 26, 28, 30, 32 which operate in response to the operation of the manual valve 20 and the energization/deenergization of the solenoid valves SA to SE, four accumulators 34, 36, 38, 40, and the five oil pressure sensors PS.

The solenoid valves SA and SC are normal-open-type valves, which are open when the electromagnetic solenoids provided therein are OFF (de-energized). On the other hand, the solenoid valves SB, SD and SE are normal-closed-type valves, which are closed when the electromagnetic solenoids provided therein are OFF. Through the controlled supply of pressurized oil by the valves 20, SA to SE, 22, 24, 26, 28, 30, and 32, the controller 200 controls gear (gear ratio)

shifting and the operation of the lockup clutch of the torque converter. FIG. 5 shows the relationship between the operation of each solenoid valve SA to SE and the gears (gear ratios) which are established in response to such operations.

FIG. 5 refers to the ON (energization) and OFF (de-energization) states of the electromagnetic solenoids of each of the solenoid valves SA to SE. The controller 200 controls solenoids based on a duty ratio (Pulse Width Modulation, i.e., the ON time in a pulse train (current)) so as to make it possible to obtain a desired gear shifting characteristic.

A description will now be given for the gear (gear ratio) shift control.

First, a description will be given for the case in which the D range is selected using the selector lever such that a spool 20a of the manual valve 20 is moved to the position corresponding to the D range.

Namely, as shown in FIG. 4, when the hook portion at the right end of the spool 20a is moved to the right to the position indicated for D3 or D2, it establishes communication between an oil path 42 and the oil path 12 which is supplied with pressurized oil adjusted to a prescribed line pressure as described above. Furthermore, since the oil path 12 is connected with the solenoid valve SC and since the oil path 42 is communicating with the solenoid valve SE, the line pressure always acts on the solenoid valve SC and the solenoid valve SE. Moreover, since the oil path 42 is also communicating with the solenoid valve SA, the line pressure always acts on the solenoid valve SA.

An oil path 12a which branches out from the oil path 12 is communicating with the right end oil chamber of a reverse pressure switching valve 22, an oil path 12b which branches out from the oil path 12 is communicating with a left end oil chamber of a pressure release valve 24, and an oil path 42a which branches out from the oil path 42 is communicating with the right end oil chamber of an out-gear control valve 26. Consequently, the line pressure causes the reverse pressure switching valve 22 and the outgear control valve 26 to be normally pushed to the left and the pressure release valve 24 to be normally pushed to the right.

Now, in the case where the D range position is selected, the controller 200 determines a gear (gear ratio) in response to the load on the engine and the speed of the vehicle, and in order to obtain such a gear (gear ratio), the control operations of each of the solenoid valves SA to SE are shown in FIG. 5.

Next, a description will be given for the operations of the clutches and brakes that accompany the operations of the solenoid valves, taking as an example the case in which gear (gear ratio) shifting is carried out to establish third (3rd) gear (gear ratio).

In this case, the solenoid valves SC and SD are to be switched from their ON state to the OFF state in order to make all the solenoid valves SA to SE to be in the OFF state. In this manner, from the state described above for 2nd gear (gear ratio), the solenoid valve SC is changed to be open while the solenoid valve SD is changed to be closed. Since the solenoid valve SA is kept open, the first clutch is left engaged. Since the solenoid valve SD is closed, the oil path 54 communicates with the drain through the solenoid valve SD, whereby the first brake B1 is disengaged or released.

On the other hand, when the solenoid valve SC is made open, pressurized oil at Line pressure is supplied to the oil path 52 to engage the third clutch K3. At this time, the fourth accumulator 40 acts to alleviate the accompanying shock. The first clutch K1 and the third clutch K3 are thus engaged to establish 3rd gear (gear ratio). In 3rd gear (gear ratio), the solenoid valve SD is controlled to be closed so that the oil pressure that acts at the left end of the pressure delivery valve 28 via the oil paths 54, 54b falls to zero. However, the spool 28a is maintained at its position to the right by the pressurized oil pressure supplied via the oil path 78. Consequently, in the same manner for the case of 2nd gear (gear ratio), when the solenoid valve SE is switched to the ON state, it becomes possible to control the lockup clutch by the pressure output from the solenoid valve SE.

As stated above, the clutches and brakes are engaged/disengaged to effect upshifting or downshifting.

The mode of operation of the gear ratio shift control system for an automatic vehicle transmission will now be explained taking as an example upshifting, more specifically, power-on upshifting (upshifting when the throttle valve is opened beyond a predetermined value).

Figure 6:
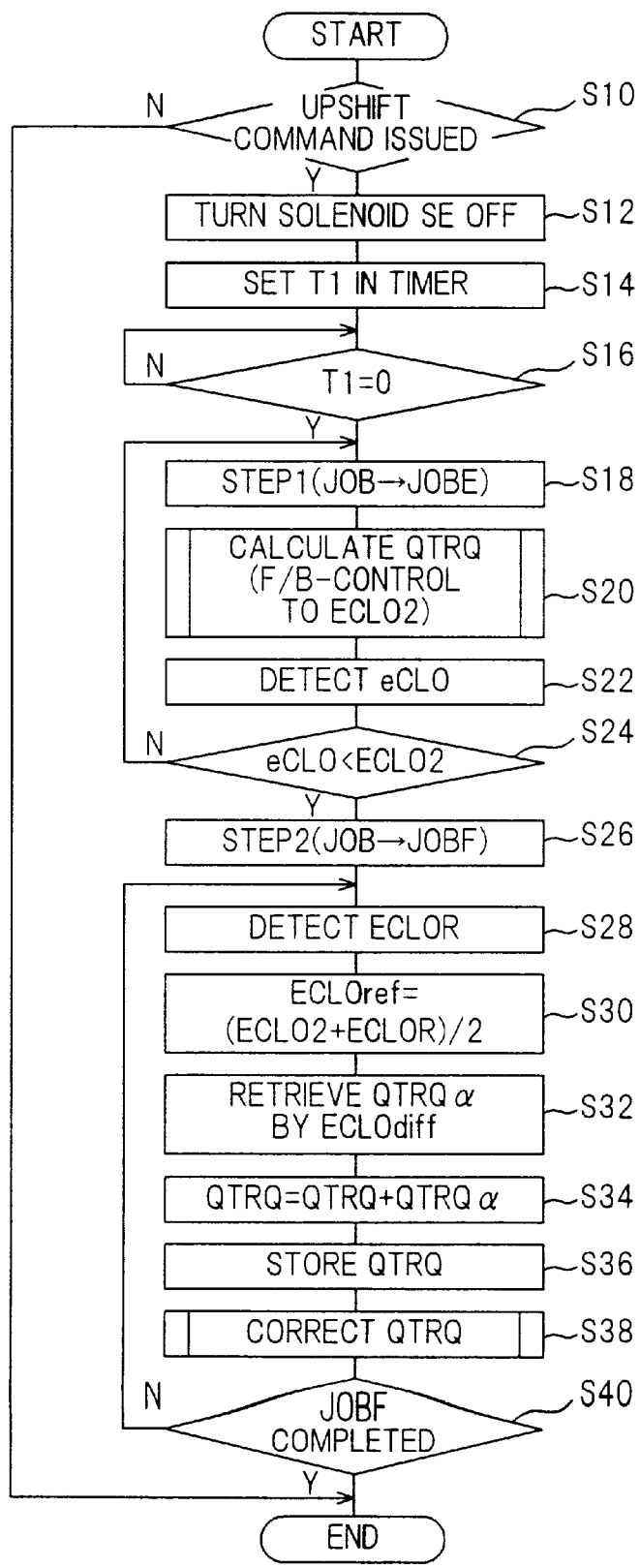
FIG. 6 is a flow chart showing the operation of the system shown in FIG. 1.

FIG. 6 is a flow chart showing the operation of the system, more specifically the operation conducted by the controller 200.

The program starts at S10 in which it is determined whether a upshift command, for example, the upshift command from 2nd gear to 3rd gear is issued and if the result is affrnative, the program proceeds to S12 in which the solenoid valve SE is turned OFF (de-energized) to disengage or release the lockup clutch.

The program then proceeds to S14 in which a timer (down counter) is set with a predetermined value T1 to start to measure time lapse, to S16 in which it is determined whether the counter value T1 has reached zero, in other words, it is determined whether the predetermined time T1 has passed. The predetermined time T1 is set to a time long enough for completely releasing the lockup clutch before entering the clutch oil supply control explained below.

When the result is affirmative, the program proceeds to S18 in which a period or time beginning from this step is named as STEP 1 and the job to be conducted there is named as JOBE.

Figure 7:
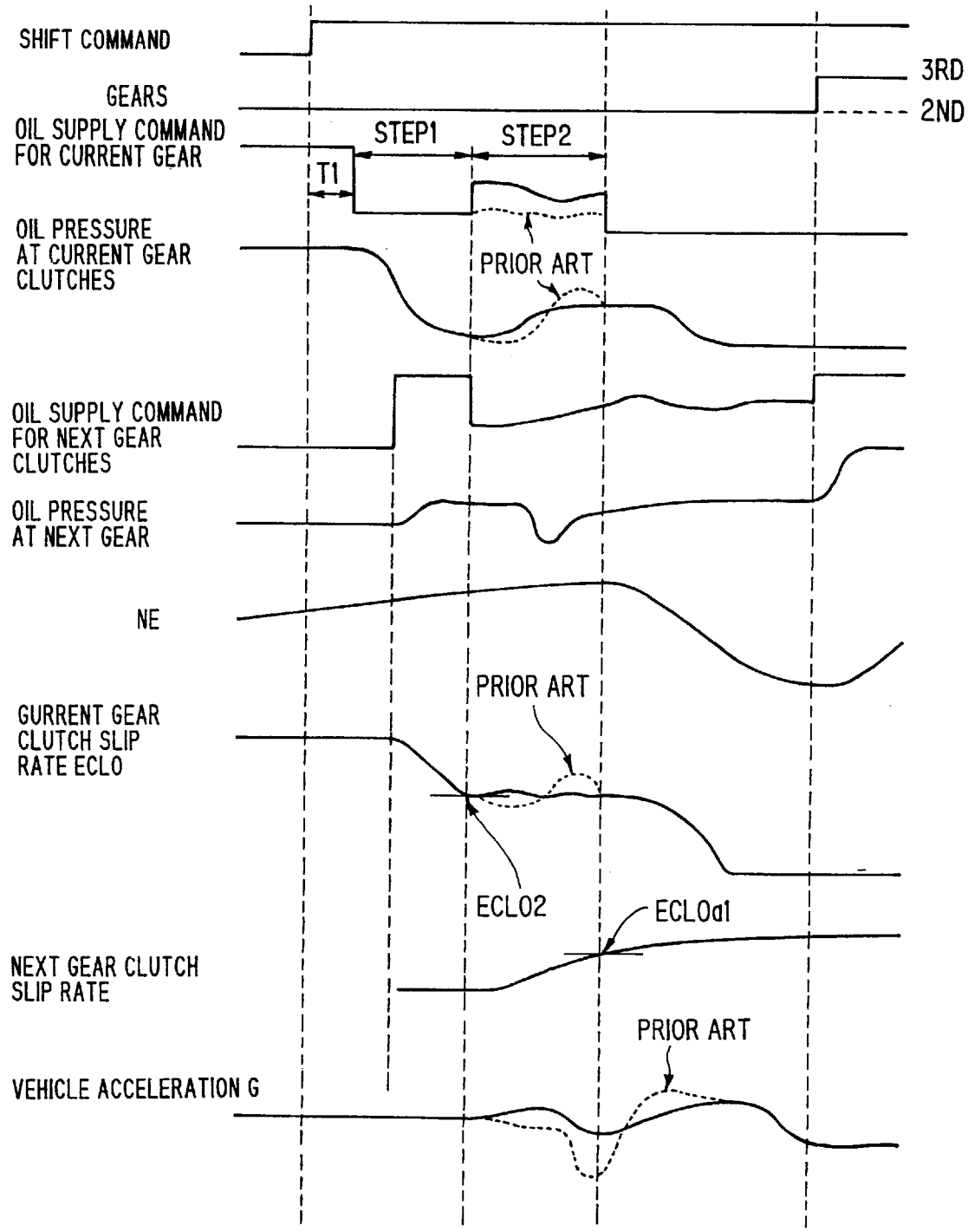
FIG. 7 is a time chart illustration of the operation shown in the flow chart of FIG. 6.

FIG. 7 is a time chart showing the procedures or jobs conducted in the flow chart of FIG. 6. As illustrated, the period after the lapse of the time T1 is called STEP 1.

The program then proceeds to S20 in which a torque-decrease command for oil supply QTRQ is determined or calculated.

Figure 8:
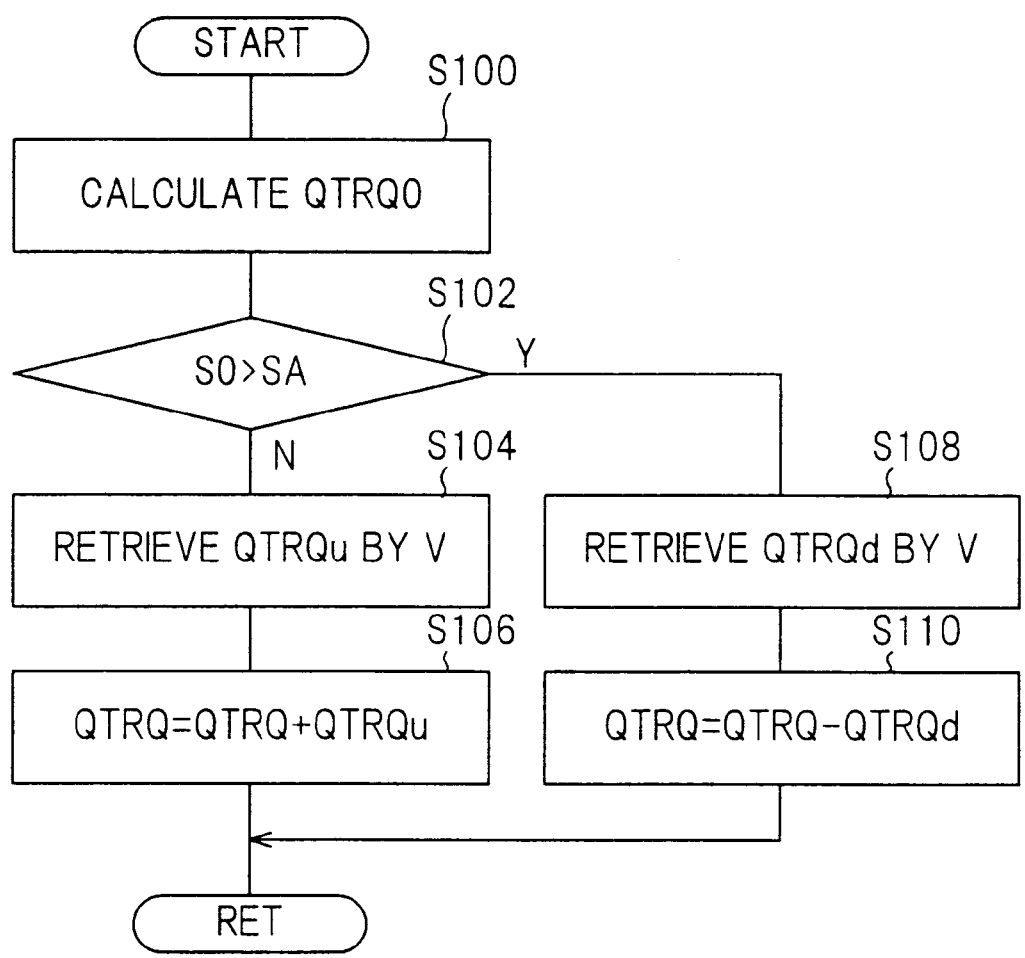
FIG. 8 is a flow chart showing the subroutine for calculating a command QTRQ referred to in the flow chart of FIG. 6.

FIG. 8 is a flow chart showing the subroutine for calculating the torque-decrease command for oil supply QTRQ.

The program starts at S100 in which an initial value QTRQ0 of the torque-decrease command for oil supply QTRQ is calculated as follows.

$$QTRQ0 = RESLOPE \times TTRQABS + RECONTACT + CR$$

In the above, RESLOPE: a coefficient for calculation; TmQABS: a basic value determined in response to the engine output torque, more specifically a value retrieved from table data, not shown, using the detected engine speed NE and manifold absolute pressure PBA (obtained through a sensor not shown) as address data; RECONTACT: an additive value prepared for respective gears (gear ratios); and CR: a correctional coefficient for throttle opening.

The initial value of the torque-decrease command for oil supply QTRQ0 is determined such that an actual slip rate eCLO (explained later) of the frictional engaging elements (clutches and brakes) that establish the gear (gear ratio) currently established (2nd) converges to a first desired slip rate ECLO2 (explained later) in response to the engine output torque.

Moreover, the initial value QTRQ0 is calculated when the program loop is executed for the first time. When the program loop is in its second and/or successive loop(s), the calculated initial value QTRQ0 is held and used as the torque-decrease command for oil supply QTRQ. The initial value QTRQ is calculated to be a value corresponding to a duty-ratio (in PWM) of the shift solenoid valves. In the specification, the initial value QTRQ0 is simply referred to as the torque-decrease command for oil supply QTRQ.

Figure 9:
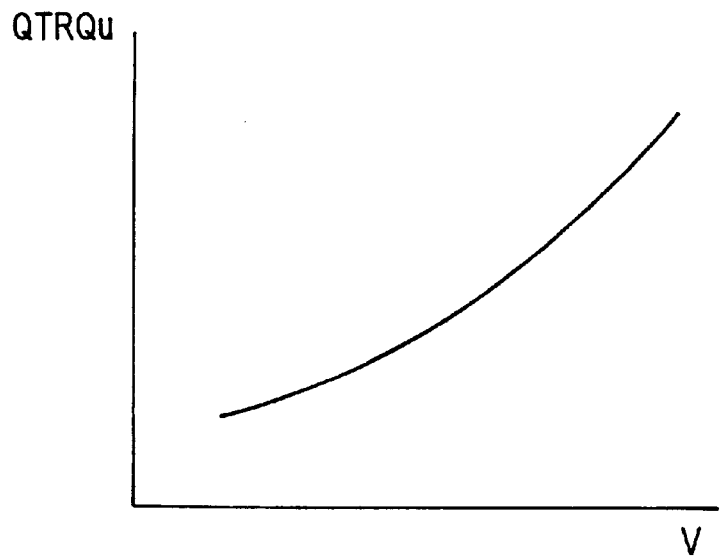
FIG. 9 is a graph showing the characteristics of table data of a correctional amount QTRQu referred to in the flow chart of FIG. 8.

The program then proceeds to S102 in which it is determined whether the current gear (gear ratio) (2nd) is larger or higher than the next gear (gear ratio) (3rd) to be shifted to, i.e., it is determined whether the current gear ratio is greater than the next gear ratio. When the result is negative, since this means that upshift is indicated, the program proceeds to S104 in which a correctional coefficient for vehicle speed at upshifting QTRQu is retrieved from table data (whose characteristics are illustrated in FIG. 9) using the detected vehicle speed V as address datum, and to S106 in which the retrieved value QTRQu is added to the command QTRQ to increased the same.

Figure 10:
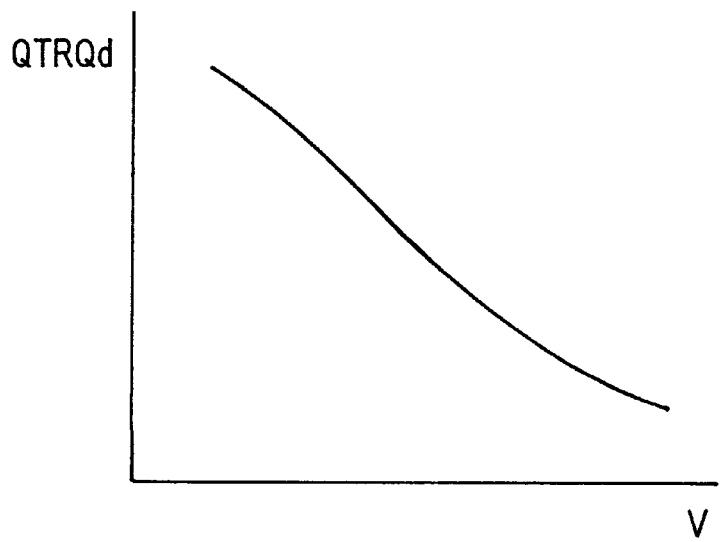
FIG. 10 is a graph showing the characteristics of table data of a correctional amount QTRQd referred to in the flow chart of FIG. 8.

When the result in S102 is affirmative, on the other hand, since this means that downshift is indicated, the program proceeds to S106 in which another correctional coefficient for vehicle speed at downshifting QTRQd is retrieved from table data (whose characteristics are illustrated in FIG. 10) using the detected vehicle speed V as the address datum, and to S110 in which the retrieved value QTRQd is subtracted from the command QTRQ to decreased the same.

Returning to the explanation of the flow chart of FIG. 6, the program proceeds to S22 in which the actual clutch slip rate eCLO of the current gear (gear ratio) (2nd) is detected or calculated as follows.

$$eCLO = (Nout/Nin) \times i$$

In the above, Nout: a transmission output shaft rotational speed (the rotational speed of the output gear 8b); Nin: a transmission input shaft rotational speed (the rotational speed of the transmission input shaft 8a); and i: reduction gear ratio.

The program proceeds to S24 in which it is determined whether the detected actual clutch slip rate eCLO is less than the first desired slip rate ECLO2, more specifically, it is determined whether the current gear clutch begins to slip by a predetermined amount corresponding to ECLO2. FIG. 7 illustrates the first desired slip rate ECLO2. The first desired slip rate ECLO2 is determined in response to the engine operating conditions for the respective gears (gear ratios).

When the result in S24 is negative, the program returns to S18 to repeat the above-mentioned procedures. When the result in S24 is affirmative, on the other hand, the program proceeds to S26 in which it is determined that the STEP 1 has been completed and a period or time beginning from this step is named as STEP 2 and the job to be conducted there is named as JOBF.

The program then proceeds to S28 in which a maximum slip rate ECLOR among the detected actual slip rate of the current gear clutch in STEP 1 is selected or detected, to S30 in which a second desired slip rate ECLOref in STEP 2 is calculated as disclosed using the detected maximun actual slip rate ECLOR and the first desired slip rate ECLO2. Specifically, the second desired slip rate ECLOref is determined by calculating an average of the maximum actual slip rate and the first desired slip rate.

The program then proceeds to S32 in which an error or difference ECLOdif in the absolute value between the second desired slip rate ECLOref and the detected maximum actual slip rate ECLOR is calculated as follows.

$$ECLOdif = |ECLOref - ECLOR|$$

Figure 11:
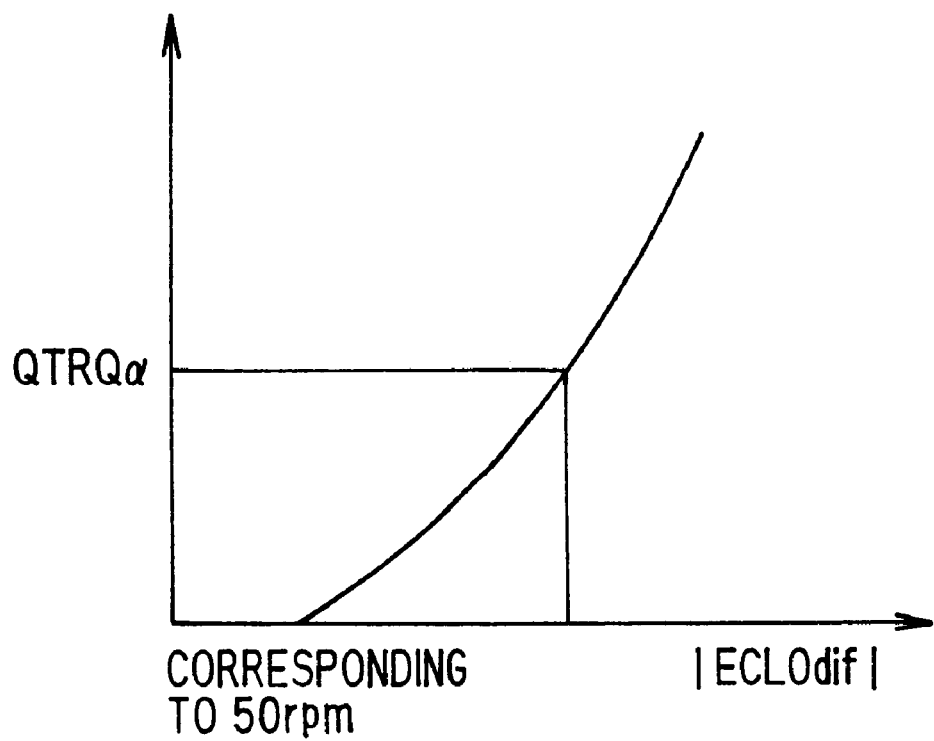
FIG. 11 is a graph showing the characteristics of table data of a correctional amount QTRQα referred to in the flow chart of FIG. 6.

Then, a correctional value QTRQα is retrieve from table data, whose characteristics are illustrated in FIG. 11, using the calculated difference ECLOdif as an address datum.

The program then proceeds to S34 in which the correctional value QTRQα is added to the torque-decrease command for oil supply QTRQ to increase the same. The corrected command is used as the command QTRQ in STEP 2. Thus, the command determined in the second step is larger than that generated in the first step. It thereby becomes possible to effect a stable shift control irrespective of a change in condition of the frictional engaging elements.

The program then proceeds to S36 in which the corrected command QTRQ is stored in the memory.

The program then proceeds to S38 in which the corrected command QTRQ is again corrected in response to the slip rate change of the current gear clutch.

Figure 12:
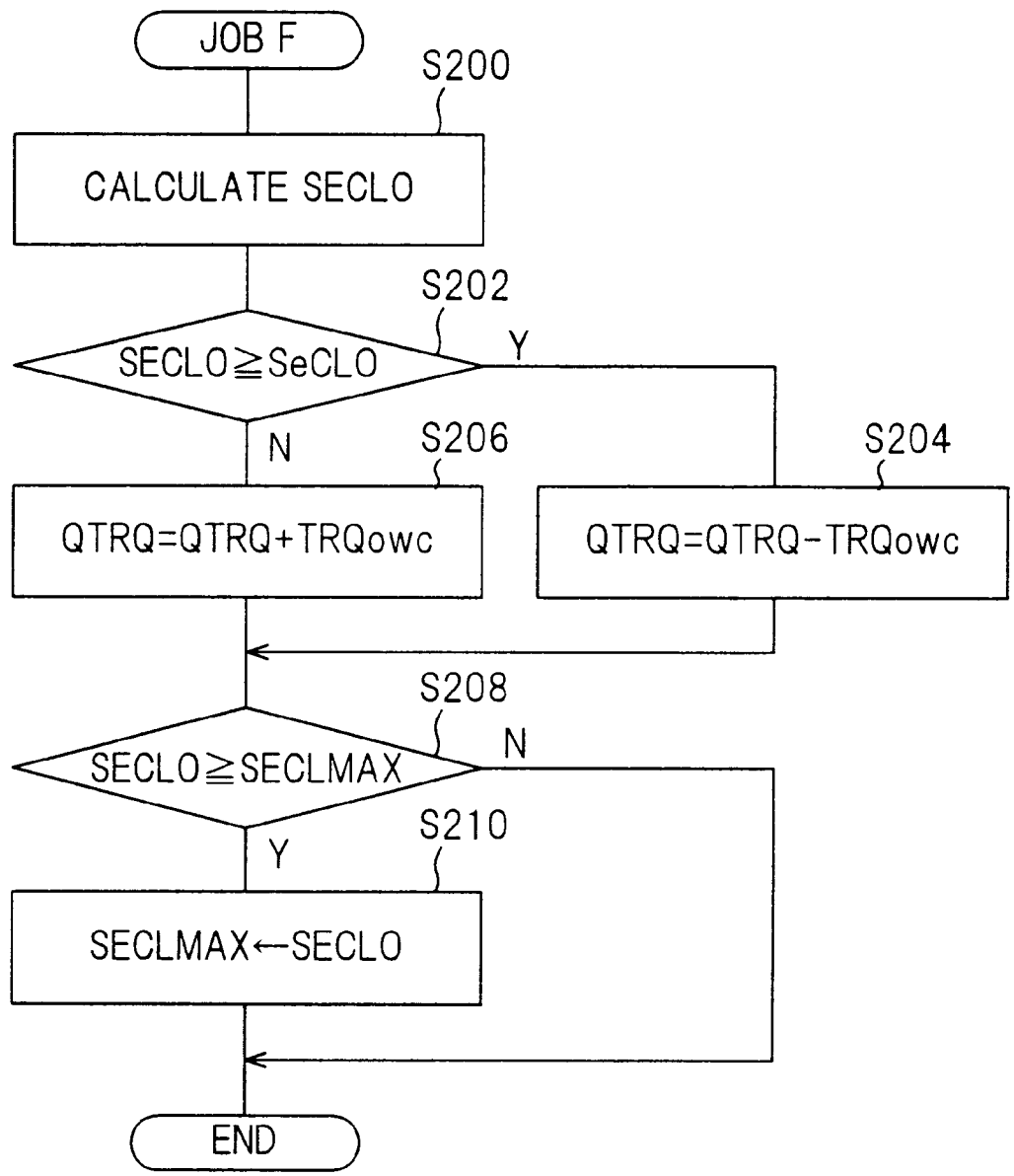
FIG. 12 is a flow chart showing the subroutine for correcting the command QTRQ referred to the in the flow chart of FIG. 6.

FIG. 12 is a flow chart showing the subroutine for the correction.

The program starts at S200 in which the actual slip rate eCLO is subtracted from a desired slip rate for the one-way clutch control to determine an actual slip rate difference ECLN. Then, using the calculated difference ECLN and a coefficient KDNT, a desired difference SECLO is calculated as follows.

$$SECLO = ECLN \times KDNT/100$$

Then the program proceeds to S202 in which an actual slip rate change SeCLO is determined by calculating a first-order difference or differential of the actual slip rate eCLO and it is determined whether the desired difference SECLO is not less than the actual slip rate change SeCLO. When the result is affirmative, the program proceeds to S204 in which a correctional amount TRQowc is subtracted from the torque-decrease command for oil supply QTRQ to decrease the same. When the result is negative, the program proceeds to S206 in which a correctional amount TRQowc is added to the torque-decrease command for oil supply QTRQ to increase the same.

Then the program proceeds to S208 in which it is determined whether the calculated difference SECLO is not less than a predetermined upper limit SECLMAX. When the result is affirmative, the program proceeds to S210 in which the calculated difference SECLO is limited to the upper limit value SECLMAX. When the result is negative, the program skips S210.

Returning to the flow chart of FIG. 6, the program proceeds to S40 in which it is determined whether the JOBF has been completed. Specifically, this is done by calculating the next gear clutch slip rate and by determining whether the calculated next gear clutch slip rate exceeds a predetermined value ECLOa1 (shown in FIG. 7).

When the result is negative, the program returns to S28. When the result is affirmative, the program is terminated.

As illustrated in FIG. 7, the command is determined such that the current gear clutch is disengaged or released when the next gear clutch slip rate exceeds the predetermined value ECLOa1.

In the case of a next upshift the torque-decrease command for oil-supply QTRQ in the JOBE (STEP 1) is determined based on the command QTRQ stored in S36 in JOBF (STEP 2).

As stated above, the embodiment is configured to detect the actual slip rate, and to correct the torque-decrease command for oil supply QTRQ in response to the difference between the detected actual slip rate and the second desired slip rate in JOBF in STEP 2 as shown in S34 in the flow chart of FIG. 6, and to employ this command as the basis for the control of a next upshift. This can prevent the clutches (and brakes) from being subjected to excessive slippage, thereby improving the service life of the clutches and brakes, and providing for the smooth execution of the gear shift control sequence transition.

Moreover, the command in JOBF in STEP 2 is determined to be larger than that in JOBE in STEP 1. This can effect a stable slip and shift control irrespective of a change in frictional condition in the clutches and brakes due to the changes in clutch plate temperature and oil temperature, etc.

Thus, the embodiment is configured to have a system for controlling gear ratio shifting in an automatic transmission (1) mounted on a vehicle, including: a plurality of gears trains (G1, G2, G3) which transmit engine torque to a drive shaft; a plurality of frictional engaging elements (K1, K2, K3, B1, B2, OWC) which operate to selectively establish one gear ratio from among the gear ratios; shift solenoid valves (SA–SE) provided in an oil pressure control circuit (300) connected to a source of pressurized oil (10); and shift control means (CONTROLLER 200) for generating a shift command to upshift from one gear ratio currently established to a next gear ratio by determining a command (QTRQ) to the solenoid valves (SA–SE) to discharge the pressurized oil from the frictional engaging elements that establish the current gear ratio so as to slip-control the frictional engaging elements, and to charge the pressurized oil to the frictional engaging elements that establish the next gear ratio to be shifted to, characterized in that said shift control means comprises: a first step (STEP 1, S18–S24) for determining the command (QTRQ) such that an actual slip rate of the frictional engaging elements that establish the current gear ratio (eCLO) converges to a first desired slip rate (ECLO2); a second step (STEP 2, S26–S40) for determining the command (QTRQ) such that the actual slip rate (eCLO) of the frictional engaging elements that establish the current gear ratio converges to a second desired slip rate (ECLOref); maximum slip rate detecting means (S28) for detecting a maximum actual slip rate (ECLOR); slip rate difference calculating means (S32) for calculating a difference (ECLOdif) between the detected maximum actual slip rate (ECLOR) and the second desired slip rate (ECLOref); command correcting means (S34) for correcting the command (QTRQ) in response to the calculated difference (ECLOdif); and command storing means (S36) for storing the corrected command (QTRQ) to be used as the command in the first step in controlling a next upshift.

In the system, the command (QTRQ) in the second step is larger than that (QTRQ) in the first step, and said second desired slip rate determining means determines the second desired slip rate (ECLOref) by calculating an average value of the detected maximum slip rate (ECLOR) and the first desired slip rate (ECLO2).

It should be noted in the above that, although the automatic vehicle transmission is described with a planetary-gear system transmission, the invention can instead be applied to an automatic vehicle transmission having parallel shafts taught, for example, in Japanese Laid-open Patent Application 8 (1996)—184,367.

Although the invention has thus been shown and described with reference to specific embodiments, it should be noted that the invention is in no way limited to the details of the described arrangements but changes and modifications may be made without departing from the scope of the invention which is defined by the appended claims.

What is claimed is:

1. A system for controlling gear ratio shifting in an automatic transmission mounted on a vehicle, including:
   a plurality of gear trains which transmit engine torque to a drive shaft;
   a plurality of frictional engaging elements which operate to selectively establish one gear ratio from among the gear ratios;
   shift solenoid valves provided in an oil pressure control circuit connected to a source of pressurized oil; and
   shift control means for generating a shift command to upshift from one gear ratio currently established to a next gear ratio by determining a command to the solenoid valves to discharge the pressurized oil from the frictional engaging elements that establish the current gear ratio so as to slip-control the frictional engaging elements, and to charge the pressurized oil to the frictional engaging elements that establish the next gear ratio to be shifted to;
   wherein:
   said shift control means comprises:
      a first step for determining the command such that an actual slip rate of the frictional engaging elements that establish the current gear ratio converges to a first desired slip rate;
      a second step for determining the command such that the actual slip rate of the frictional engaging elements that establish the current gear ratio converges to a second desired slip rate;
      maximum slip rate detecting means for detecting a maximum actual slip rate;
      slip rate difference calculating means for calculating a difference between the detected maximum actual slip rate and the second desired slip rate;
      command correcting means for correcting the command in response to the calculated difference; and
      command storing means for storing the corrected command to be used as the command in the first step in controlling a next upshift.

2. A system according to claim 1, wherein the command in the second step is larger than that in the first step.

3. A system according to claim 1, where said second desired slip rate determining means determines the second desired slip rate by calculating an average value of the detected maximum slip rate and the first desired slip rate.

4. A system according to claim 2, where said second desired slip rate determining means determines the second desired slip rate by calculating an average value of the detected maximum slip rate and the first desired slip rate.

5. A method of controlling gear ratio shifting in an automatic transmission mounted on a vehicle, including:
   a plurality of gears each of which transmit engine torque to a drive shaft;
   a plurality of frictional engaging elements which operate to selectively establish one gear ratio from among the gear ratios; and
   shift solenoid valves provided in an oil pressure control circuit connected to a source of pressurized oil;
   and including the step of:
      generating a shift command to upshift from one gear ratio currently established to a next gear ratio by determining a command to the solenoid valves to discharge the pressurized oil from the frictional engaging elements that establish the current gear ratio so as to slip-control the frictional engaging elements, and to charge the pressurized oil to the frictional engaging elements that establish the next gear ratio to be shifted to;

wherein the method comprises the steps of:

determining the command such that an actual slip rate of the frictional engaging elements that establish the current gear ratio converges to a first desired slip rate;

determining the command such that the actual slip rate of the frictional engaging elements that establish the current gear ratio converges to a second desired slip rate;

detecting means for detecting a maximum actual slip rate;

calculating a difference between the detected maximum actual slip rate and the second desired slip rate;

correcting the command in response to the calculated difference ; and storing the corrected command to be used as the command in the first step in controlling a next upshift.

6. A method according to claim 5, wherein the command in the second step is larger than that in the first step.

7. A method according to claim 5, where said second desired slip rate is determined by calculating an average value of the detected maximum slip rate and the first desired slip rate.

8. A method according to claim 6, where said second desired slip rate is determined by calculating an average value of the detected maximum slip rate and the first desired slip rate.

9. A computer program embodied on a computer-readable medium for controlling gear ratio shifting in an automatic transmission mounted on a vehicle, including:

a plurality of gear trains each of which transmits engine torque to a drive shaft;

a plurality of frictional engaging elements which operate to selectively establish one gear ratio from among the gear ratios; and shift solenoid valves provided in an oil pressure control circuit connected to a source of pressurized oil;

and including the step of:

generating a shift command to upshift from one gear ratio currently established to a next gear ratio by determining a command to the solenoid valves to discharge the pressurized oil from the frictional engaging elements that establish the current gear ratio so as to slip-control the frictional engaging elements, and to charge the pressurized oil to the frictional engaging elements that establish the next gear ratio to be shifted to;

wherein the method comprises the steps of:

determining the command such that an actual slip rate of the frictional engaging elements that establish the current gear ratio converges to a first desired slip rate;

determining the command such that the actual slip rate of the frictional engaging elements that establish the current gear ratio converges to a second desired slip rate;

detecting means for detecting a maximum actual slip rate;

calculating a difference between the detected maximum actual slip rate and the second desired slip rate;

correcting the command in response to the calculated difference; and storing the corrected command to be used as the command in the first step in controlling a next upshift.

* * * * *